(12) United States Patent
Knapp

(10) Patent No.: US 7,681,803 B2
(45) Date of Patent: Mar. 23, 2010

(54) PERFECTED DEVICE FOR TAKING SHOWERS AT ALTERNATING TEMPERATURES

(75) Inventor: Alfons Knapp, Biberach (DE)

(73) Assignees: Masco, Indianapolis, IN (US); Masco Corporation of Indiana, Indianapolis, IN (US)

( * ) Notice: Subject to any disclaimer, the term of this patent is extended or adjusted under 35 U.S.C. 154(b) by 220 days.

(21) Appl. No.: 11/767,058

(22) Filed: Jun. 22, 2007

(65) Prior Publication Data

US 2007/0290055 A1 Dec. 20, 2007

Related U.S. Application Data

(63) Continuation of application No. PCT/IB2005/003794, filed on Dec. 15, 2005.

(30) Foreign Application Priority Data

Dec. 22, 2004 (IT) .......................... TO2004A0893

(51) Int. Cl.
  *G05D 23/12* (2006.01)
  *G05D 23/13* (2006.01)
  *G05D 11/00* (2006.01)
(52) U.S. Cl. .................... 236/12.13; 236/12.23; 137/88
(58) Field of Classification Search ................ 236/12.1, 236/12.13, 12.2, 12.23; 137/88, 89, 112
See application file for complete search history.

(56) References Cited

U.S. PATENT DOCUMENTS

| 4,183,377 | A | * | 1/1980 | Bernat | .................... 137/625.17 |
| 4,258,751 | A | * | 3/1981 | Humpert | .................. 137/625.4 |
| 5,551,630 | A | * | 9/1996 | Enoki et al. | .............. 236/12.13 |

FOREIGN PATENT DOCUMENTS

| DE | 2260845 | | 6/1974 |
| DE | 2735544 A | * | 2/1979 |
| DE | 29720701 U | | 4/1998 |
| EP | 1094378 | | 4/2001 |
| JP | 10131249 A | * | 5/1998 |
| WO | WO03095752 | | 11/2003 |

OTHER PUBLICATIONS

International Search Report.

* cited by examiner

*Primary Examiner*—Chen-Wen Jiang
(74) *Attorney, Agent, or Firm*—Brinks Hofer Gilson & Lione

(57) ABSTRACT

Disclosed is a device for taking showers at alternating temperatures. The device is used with a delivery pipe for one or several shower heads, a hot water pipe that is connected to the outlet of a thermostatic mixer, and a cold water pipe which is connected to a water pipe. The device includes a switching means regarding the hot water pipe and the cold water pipe. The switching means is provided with a first control means and a second control means, both of which can be moved into two positions in such a way that the second control means is in a first position when the first control means does not connect the delivery pipe to the cold water pipe while the second control means is in a second position when the first control means connects the delivery pipe to the cold water pipe.

4 Claims, 3 Drawing Sheets

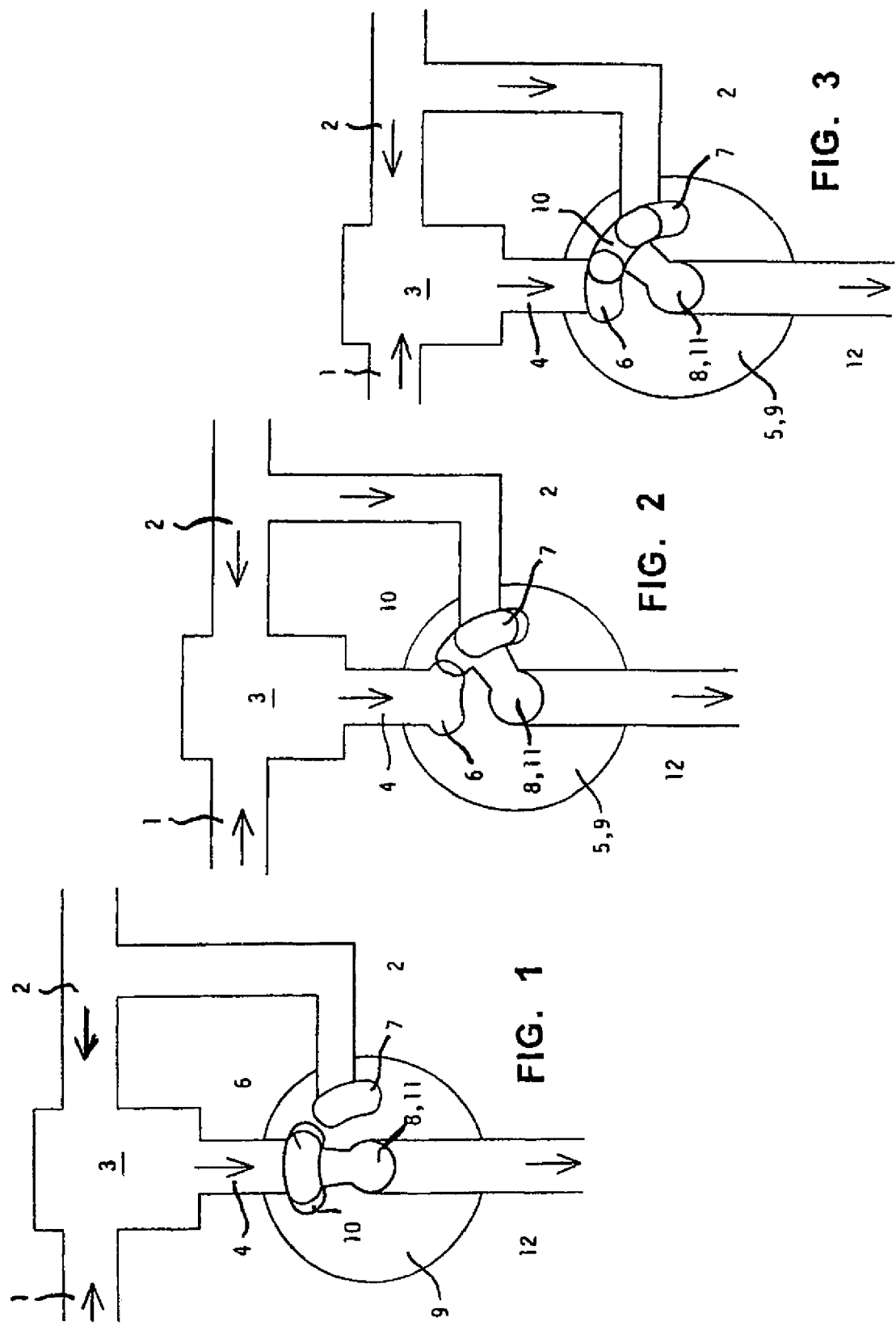

PERFECTED DEVICE FOR TAKING SHOWERS AT ALTERNATING TEMPERATURES

CROSS-REFERENCE TO RELATED APPLICATIONS

This application is a continuation of International Application No. PCT/IB2005/003794 filed on Dec. 15, 2005, which claims the benefit of Italian Patent Application No. TO2004A000893 filed Dec. 22, 2004. The disclosures of the above applications are incorporated herein by reference.

FIELD

The present disclosure applies to a perfected device for taking showers at alternating temperatures, the so-called Scottish shower or fitness shower.

BACKGROUND

The statements in this section merely provide background information related to the present disclosure and may not constitute prior art.

A shower at alternating temperatures consists of supplying water at a relatively high temperature and water at a relatively low temperature to shower heads during alternating periods, whereby cycles of warm and cold-water flow are realized, which produce physiological reactions, which it is assumed produce a feeling of well-being. In practice, this process is carried out by periodically switching the inflow to the showerheads between the outlet of a thermostatic mixer, which supplies the warm water at a preset temperature, and the inflow from a water pipe that supplies the cold water. However, this known process for showering at alternating temperatures involves several disadvantages.

A first disadvantage is found in the fact that during the period of cold-water flow, the thermometer element, which is part of the thermostatic mixer and measures the temperature of the mixed water, cools down, as it is not immersed in the flow of mixed water, which is interrupted, and the element must again be brought up to temperature when the flow of warm water starts again. Warming the thermometer element requires a certain time, and during this transition period, the mixer delivers water at a temperature that is higher than the preset temperature. This causes discomfort to the person who is taking a shower, and it also involves the risk of burns, particularly when the inflow to the thermostatic mixer consists of water at a high temperature from a boiler, when said water is at a very high temperature. This disadvantage is especially serious when the thermostatic mixer uses a thermometer element of the metallic type, whose response is considerably slower than the type of thermometer element with wax.

Another disadvantage is the fact that while the temperature of the water flow at a relatively higher temperature can be preset as desired by the user by setting the thermostatic mixer accordingly, the temperature of the water flow at a relatively lower temperature cannot be set during the period of cold-water flow, because this is water that is supplied directly from the water pipe. Depending on the time and the season in question, this temperature can be very different from the one desired by the user and is generally too cold to correctly take a shower at alternating temperatures.

SUMMARY

A task of the present disclosure is to perfect devices for showering at alternating temperatures so that the disadvantages of known devices are eliminated or ameliorated. In particular, a first objective of the disclosure is to create a device that ensures that the thermostatic mixer always supplies mixed water at the preset temperature, so that the water flow, when the showering cycle switches from cold-water flow to warm-water flow, has the desired temperature immediately, and not only after a transitional period. A further objective of the disclosure is to create a device that enables the user not only to set the flow temperature of the warm water according to his requirements and wishes, but also to set the flow temperature of the cold water at a level that is more or less above the temperature of the water supplied from the water pipe. It is also an objective of the disclosure to create devices for showering at alternating temperatures whose handling and adjustment is particularly simple and convenient for the user. And finally, it is an objective of the disclosure that the previously cited tasks be accomplished by means of inexpensive devices.

The first objective is inventively achieved with a device for taking showers at alternating temperatures, which in the known art comprises a supply pipe for one or more showerheads, a warm water pipe that is connected to the outlet of a thermostatic mixer, a cold water pipe that is connected to a delivery pipe, and switching means for switching the connection of the delivery pipe for the shower heads in relation to the warm water pipe and the cold water pipe, in that the switching means comprises a first control means that can assume two positions, in one position connecting the delivery pipe with the cold water pipe, and in the second position not connecting the delivery pipe with the cold water pipe, and a second control means that can assume two positions, the delivery pipe being connected with the warm water pipe in the first position, while in the second position the connection between the delivery pipe and the cold water pipe is constricted, without being interrupted; wherein the two control means are mutually coordinated in such a way that the second control means assumes its first position when the first control means does not connect the delivery pipe with the cold water pipe, and the second control means assumes its second position when the first control means connects the delivery pipe with the cold water pipe.

Thanks to these features, during the periods of cold-water flow, a limited amount of water coming out of the thermostatic mixer will be added to the cold water coming out of the water pipe. This amount can be small enough so that its influence on the temperature of the water supplied to the showerheads is negligible, so that the method of functioning of the inventive device is equivalent to the method of functioning of a known device, but a limited flow of mixed water continuously passes through the thermostatic mixer, and this flow, despite its small magnitude, maintains the temperature of the thermometer element of the thermostatic mixer. As a result, when inflow to the shower is switched to warm water after a period of cold-water flow, the thermostatic mixer is already prepared to supply water at the preset temperature, and there is no transitional period with a flow of water at an excessively high temperature.

The second position of the second control means can advantageously be adjusted by the user so that a larger or smaller constriction of the connection of the supply pipe to the warm water pipe can be realized.

In this way, the user can adjust the total amount of the additional mixed water added to the cold water coming from the water pipe during the period of cold-water flow, so that during these periods, the cold water supplied can be more or less modified in relation to the water coming out of the water pipe.

The device advantageously has a single actuating means available to the user which controls both control means, in order to switch from a flow of warm water to a flow of cold water, and vice versa, and this actuating means can be moved between two positions, which are defined by catches, so that the user can switch from one flow mode to the other flow mode by moving the actuating means between the catches, without having to concern himself with the adjustment of the position of the actuating means. In addition, the catch corresponding to the position for the flow of cold water is preferably adjustable, so that the user can set the temperature of the cold water before showering, without having to think about this while taking a shower.

The two control means can be made of a deflector that comprises a fixed plate with two openings that are connected to the warm water pipe or, as the case may be, to the cold water pipe, and a movable plate, that is displaceable through the action of an actuating means and has an opening that is connected to the delivery pipe, wherein the displacement path of the movable plate is limited by two catches, the first catch determining a position in which the opening of the movable plate is connected only to the opening that is connected to the warm water pipe, while the second catch determines a position in which the opening of the movable plate is connected to both the opening that is connected to the cold water pipe and, to a limited extent, to the opening that is connected to the warm water pipe.

The second catch is preferably provided with means for adjusting its position.

Alternatively, the second control means can consist of a deflector in the shape of a pusher, which comprises a first section for blocking or unblocking a channel connected to the cold water pipe and a second section for unblocking or only partially blocking a channel connected to the warm water pipe.

The deflector in the form of a pusher is preferably provided with means for setting the degree of partial blocking of the channel connected to the warm water pipe.

DRAWINGS

These and additional characteristics, objectives, and functions of the objective of the present disclosure are seen in more detail in the following description of a few embodiments, with reference to the accompanying drawings, which depict non-restrictive examples, of which;

FIGS. 1 to 3 provide a schematic presentation of the concept of the disclosure with reference to a deflector with plates shown in three characteristic positions;

DETAILED DESCRIPTION

Figure 7:
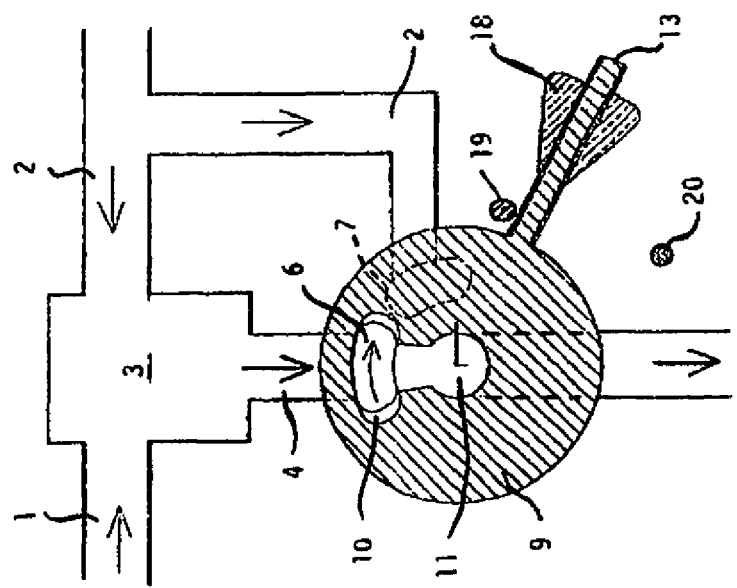
FIG. 7 illustrates an arrangement of the actuating element and the catches, one of which is adjustable, of a movable plate according to the previous figures.

FIGS. 1 to 3 schematically illustrate a system for a shower with alternating temperatures with a thermostatic mixer and with a deflector or, as the case may be, a guide of the type with plates or, as the case may be, disks. The numeral 1 designates a delivery pipe for water at a high temperature, which generally comes from a boiler (not shown), and the numeral 2 designates a pipe for water at a lower temperature, which generally comes from a water pipe (not shown). The pipes 1 and 2 empty into a schematically depicted thermostatic mixer designated by 3, which supplies mixed water via a warm water pipe 4, which consists of water at a high temperature mixed in a suitable manner with water at a lower temperature. The cold water pipe 2 is also connected to the deflector.

Figure 4:
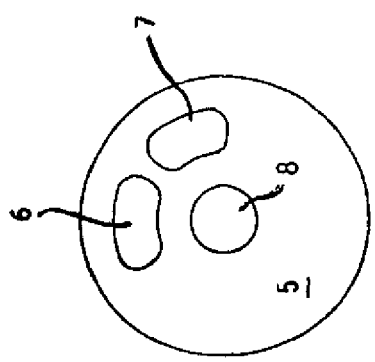
Figure 5:
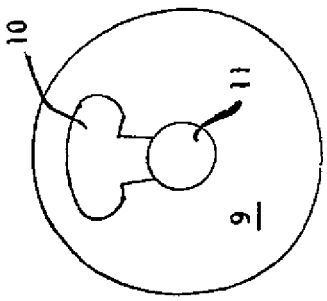

The two plates, the fixed plate 5 and the movable plate 9, which in this case form the deflector, are illustrated individually in FIGS. 4 and 5, and lie one on top of the other in FIGS. 1 to 3.

The fixed plate 5 has two admeasurement openings 6 and 7, to which the warm water pipe 4 coming from the thermostatic mixer 3, or, as the case may be, the cold water pipe 2 coming from the water pipe, are connected. A third central opening 8 is connected to the delivery pipe 12 for the showerheads (not shown).

The movable plate 9 has an admeasurement opening 10 intended for interaction with the openings 6 and 7 of the fixed plate 5, as well as a central opening 11 connected to the admeasurement opening 10 and intended for connection with the opening 9 of the fixed plate 5.

In FIG. 1, the system is shown in a state of warm-water flow. The fixed plate 9 is in a position in which its opening 10 is connected to the opening 6 of the fixed plate 5 but is not connected to the opening 7 of the fixed plate 5. Only warm water flows through the delivery pipe 12 for the shower, this water coming out of the warm water pipe 4 connected to the thermostatic mixer 3. The user selects this state during periods in which he wants to shower with warm water at the temperature set by him.

In FIG. 2, the system is shown in a state of cold-water flow. The fixed plate 9 is in a position in which its opening 10 is connected mainly to the opening 7 of the fixed plate 5 but is also connected, to a greatly reduced extent, to the opening 6 in the fixed plate 5. Chiefly cold water is sent to the delivery pipe 12 for the shower, the water coming out of the cold water pipe connected to the water pipe 2, but to which a small amount of warm water is also added, which comes out of the warm water pipe 4 that is connected to the thermostatic mixer 3. This addition of warm water can be restricted so that is does not significantly modify the temperature of the cold water coming out of the cold water pipe 2 and is therefore not noticeable. Nevertheless, a reduced amount of water still flows through the thermostatic mixer 3, maintaining its thermometer element at a temperature that does not cool down, in contrast to what happens in the state of the art. As a result, when the user wants to transfer from this state, which he chooses during periods in which he wants to shower with cold water, to the state of warm-water flow, the thermostatic mixer is already prepared to deliver water at the temperature set by the user, and it no longer requires a transition period to regain this state.

FIG. 3 shows how it is also possible, in terms of the disclosure, to set the temperature during periods of cold-water flow so that the temperature of the water coming from the water pipe, which is generally too low, can be raised to a greater or lesser degree.

It is actually sufficient to displace the movable plate 9 into a position in which its opening 10 is also connected to the opening 6 of the fixed plate 5, unless it is connected to the opening 7 of the fixed plate 5 to a greater extent than the greatly reduced extent seen in FIG. 2. In this state, a significant amount of warm water that comes out of the warm water pipe 4 connected to the thermostatic mixer 3 is added to the cold water coming out of the cold water pipe 2, and in this way, the temperature of the water in the water pipe is modified a little, or even to a considerable degree, according to the user's wish, even though it essentially remains cold water for the purpose of showering with alternating temperatures.

Figure 6:
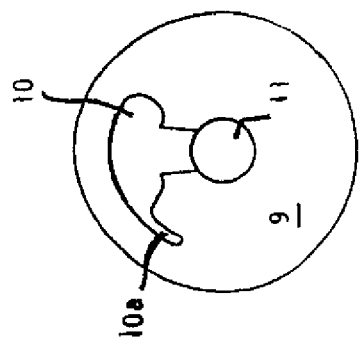
FIGS. 4 to 6 illustrate an example of the embodiments that can accommodate the plates of a deflector according to FIGS. 1 to 3.

FIG. 6 illustrates a variant of the form of the movable plate 9. In this case, the opening 10 of the movable plate 9 is lengthened at one end by an addition 10a of reduced width. This enables a finer adjustment of the reduced amount of water that is constantly added, using this disclosure, to the cold water in order to maintain the temperature in the thermostatic mixer, as well as an adjustment of the larger amount of warm water that might be added at the user's wish in order to modify the water temperature.

It should be kept in mind that the described embodiments of the fixed and movable plates are only examples, which is why these plates can be given different physical forms that realize the same functions.

FIG. 7 illustrates how the movable plate 9 of the deflector can be operated, for example by means of a lever 13, and how the displacement of this, lever can be limited by a first catch 19, which determines the flow-state of the warm water, and by a second catch 20 that determines the flow-state of the cold water. As a result of the presence of these catches, the user only has to displace the lever 13 to one or the other end of the path available to it, in order to transfer from one flow-state to the other, without having to check the position of the lever.

In addition, FIG. 7 shows that the lever 13 can be provided with a conical cuff 18, which is screwed on in an adjustable position, and which is intended for interaction with the second catch 20, in order to modify the position of the end of the path of the lever 13, which determines the flow of the cold water. In this way, the cuff 18 is actually a part of the second catch of the device. By adjusting the position of the cuff 18, the user can set the temperature at which the cold water is added, and he can do this before starting to shower, without having to concern himself with any further adjustment of the temperature of the cold water. However, it is obvious that numerous additional arrangements can be made, in order to make the path adjustable that is available to the lever 13 of the deflector, both by means of action on the lever itself and by means of action on the catch 20. The latter, for example, can be mounted on a rotatable disk or a slide that is slideable in translation, whereby these movable parts can be fixed in different positions.

Figure 9:
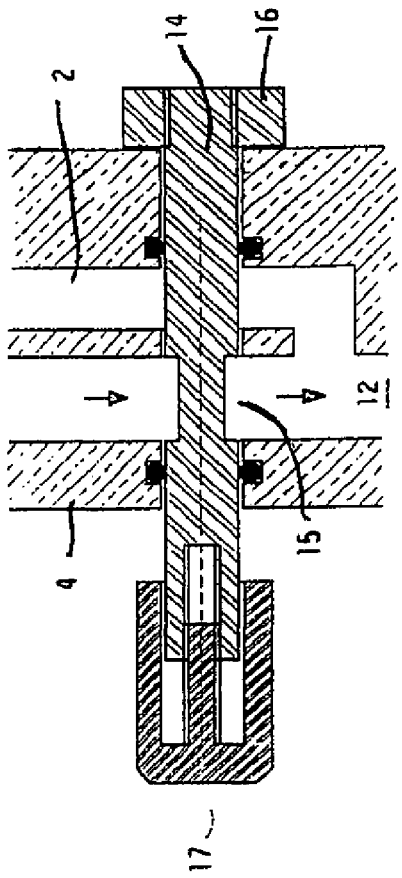
FIGS. 9 and 10 illustrate the deflector in the form of a pusher according to FIG. 8, in two characteristic positions.
Figure 10:
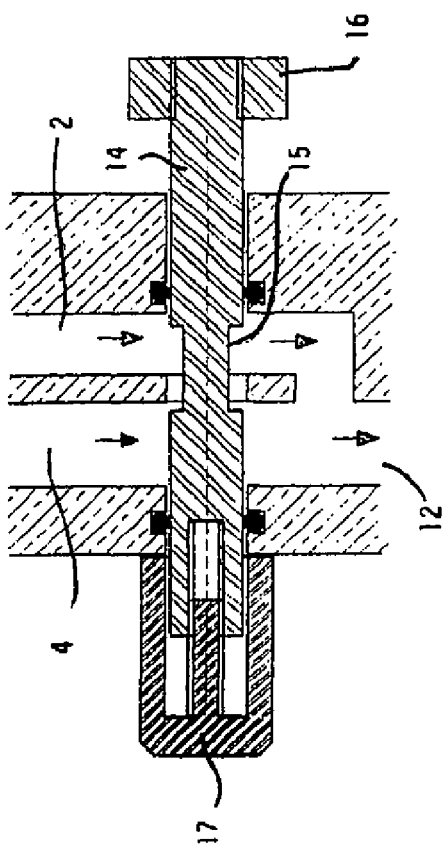
Figure 8:
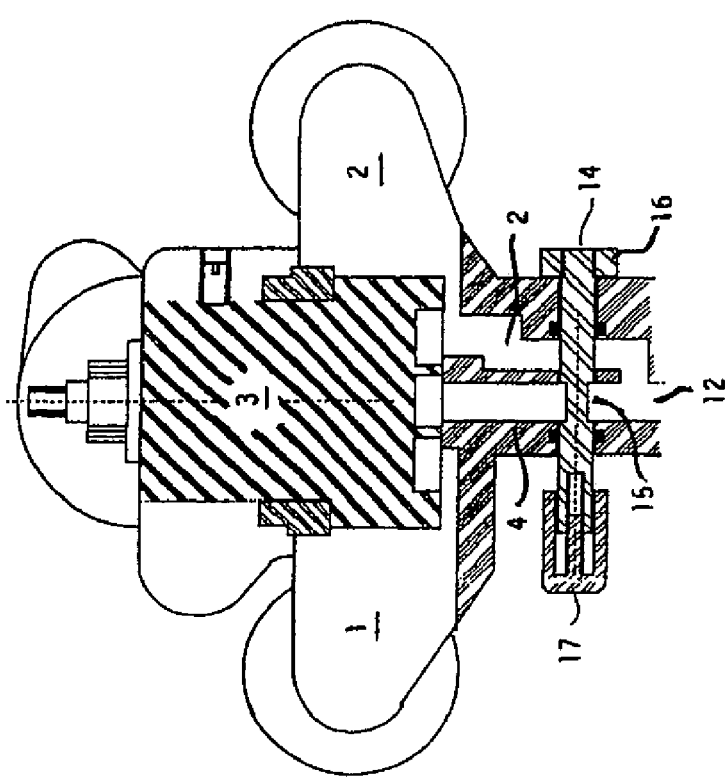
FIG. 8 illustrates a deflector in the form of a pusher, which is affixed at the outlet of a thermostatic mixer.

FIGS. 8 to 10 refer to an embodiment in which the deflector has the character of a pusher, that only has to be pulled or pushed by a user in order to transfer from warm-water flow to cold-water flow, and vice versa.

In this case, the actuating agent of the deflector is a rod 14 that is trued with a recess 15. This rod 14 passes through the pipes 2 and 4 and serves as a sluice. In the position according to FIG. 9, the recess 15 allows the passage of water from the warm water pipe 4 to the delivery pipe 12 for the shower, while the rod 14 blocks the cold water pipe 2. The corresponding position of the rod 14 is determined by a fixed catch 16, so that the user only has to pull a pusher 17 that is screwed onto the rod 14 up to the end of its path in order realize the state of warm-water flow.

In the position according to FIG. 10, the recess 15 in the rod 14 allows the passage of water from the cold water pipe 2 to the delivery pipe 12 for the shower, whereby, however, it allows only limited passage for water from the warm water pipe 4 to the delivery pipe 12 for the shower, which ensures good functioning of the thermostatic mixer 3, as explained above. The corresponding position of the rod 14 is determined by the presence of the pusher 17, so that the user only has to pull the pusher 17 to the end of its path in order to realize the state of warm-water flow.

In addition, the pusher 17 is screwed onto the rod 14 in an adjustable position, so that the user, by rotating the pusher 17, can preset the position assumed by the rod 14 when the pusher 17 is pushed, and in this way can preset the size of the passage available to the warm water during cold-water flow, and the user can, if he wishes, determine a variation of the temperature of the water in the periods of cold-water flow.

Alternatively, the rod 14 can be rotatably moved between certain positions and display configurations that are suitable for realizing the same behavior in the manner described above.

The inventive device therefore makes it possible, with essentially simple means and in a secure manner, to eliminate the disadvantages of known devices for showering at alternating temperatures, particularly the discomfort and potential risk that result from the delay in response of the thermometer element of a thermostatic mixer, and it makes it possible for the user, with embodiments that exploit all of the possibilities offered by the disclosure, to modify the temperature of the water during periods of cold-water flow, whereby this function is not present at all in known devices. In addition, the device puts the user in a position to use these functions in an extremely simple way by determining operation before taking a shower and not having to perform any further manipulation during the act of showering.

It should be kept in mind that the disclosure is not limited to the described embodiments that are illustrated as examples. A number of modifications are described, and additional modifications are within the competence of a person skilled in the art. These and additional modifications, as well as any replacements by technical equivalents, can be added to the examples described and illustrated without exceeding the extent of protection of the disclosure and this patent.

What is claimed is:

1. A device for taking showers at alternating temperatures and configured for connection to a delivery pipe for one or more shower heads, a warm water pipe that is connected to the outlet of a thermostatic mixer, and a cold water pipe that is connected to a water pipe, the device comprising a switching means for switching the connection of the delivery pipe to the shower heads relative to the warm water pipe and the cold water pipe, characterized in that the switching means comprises:

a movable deflector having an opening configured for connection to the warm water pipe, the cold water pipe, and the delivery pipe, the movable deflector being capable of assuming at least two positions, the first of which connects the delivery pipe to the warm water pipe via the opening and the second position constricts connection of the delivery pipe to the warm water pipe and connects the delivery pipe to the cold water pipe via the opening; and a fixed plate, which has two openings that are connected to the warm water pipe or, as the case may be, to the cold water pipe, wherein a displacement path of the movable deflector is defined by two catches, the first catch, determining a position in which the opening of the movable deflector is connected only to opening that is connected to the warm water pipe, while the second catch defines a position in which the opening of the movable deflector is connected to both the opening that is connected to the cold water pipe and the opening that is connected to the warm water pipe, to a limited extent, wherein the second catch is provided with means for adjusting its position.

2. The device according to claim 1, characterized in that the adjustment means comprises a conical cuff that is screwed in an adjustable position to an actuating lever of the movable deflector and interacts with a fixed catch.

3. A device for taking showers at alternating temperatures and configured for connection to a delivery pipe for one or more shower heads, a warm water pipe that is connected to the outlet of a thermostatic mixer, and a cold water pipe that is connected to a water pipe, the device comprising a switching means for switching the connection of the delivery pipe to the shower heads relative to the warm water pipe and the cold water pipe, characterized in that the switching means comprises:

a deflector in the form of a pusher, which features a first section for blocking or unblocking a channel that is connected to the cold water pipe, and a second section for unblocking or only partially blocking a channel that is connected to the warm-water pipe, the pusher provided with means for adjusting the degree of the partial blocking of the channel that is connected to the warm water pipe, and the pusher comprising a rod with a recess, which passes through the warm water pipe and the cold water pipe in order to control them, and which is provided with a fixed catch and an adjustable catch, which consists of a pusher that is screwed onto the rod in an adjustable position.

4. The device according to claim 3, characterized in that the rod is rotatably movable between fixed positions.

* * * * *